United States Patent [19]
Conway

[11] 3,840,821
[45] Oct. 8, 1974

[54] PHASE LOCK LOOP WITH SAMPLING TECHNIQUES FOR REGENERATING CLOCK SIGNAL ASSOCIATED WITH DATA INPUT SIGNALS

[75] Inventor: Patrick H. Conway, Minneapolis, Minn.

[73] Assignee: Sperry Rand Corporation, New York, N.Y.

[22] Filed: Feb. 16, 1970

[21] Appl. No.: 14,847

Related U.S. Application Data

[62] Division of Ser. No. 660,159, July 27, 1967, abandoned.

[52] U.S. Cl. .................... 331/14, 331/1 A, 331/17, 331/25

[51] Int. Cl. .............................................. H03b 3/04

[58] Field of Search ............ 331/1 A, 14, 17, 18, 25

[56] References Cited

UNITED STATES PATENTS 3,479,598 11/1969 Weller .......................... 331/1 A X

*Primary Examiner*—Herman Karl Saalbach
*Assistant Examiner*—Siegfried H. Grimm
*Attorney, Agent, or Firm*—Thomas J. Nikolai; Kenneth T. Grace; John P. Dority

[57] ABSTRACT

A phase lock loop for use in the receiver portion of a digital data communication system wherein the received signal is periodically sampled at two points during a defined time interval and the relative polarity of the two samples is determined. A voltage controlled oscillator is provided along with logic circuits for sensing the sampled signals and the frequency of oscillation of the voltage controlled oscillator is varied in accordance therewith.

8 Claims, 16 Drawing Figures

PHASE LOCK LOOP
(SAMPLE METHOD)

INTEGRATION METHOD

PHASE LOCK LOOP
(SAMPLE METHOD)

PHASE LOCK LOOP (EARLY-LATE GATE METHOD)

COUNTER (PHASE LOCK LOOP)

PHASE LOCK LOOP WITH SAMPLING TECHNIQUES FOR REGENERATING CLOCK SIGNAL ASSOCIATED WITH DATA INPUT SIGNALS

CROSS REFERENCE TO RELATED APPLICATIONS

This application is a division of application Ser. No. 660,159, filed July 27, 1967 (now abandoned) which, in turn, was a continuation-in-part of commonly assigned copending application Ser. No. 606,882 filed Jan. 3, 1967 (now abandoned).

BACKGROUND OF THE INVENTION

FIELD OF THE INVENTION

This invention relates generally to digital type communication systems and more particularly to a phase lock loop suitable for use in a pulse code modulation communication systems in which the clock signal is regenerated at the transmitted bit rate and the data for pulse code modulation signals is reconstructed.

PROBLEM TO BE SOLVED

The voltage signals at various points to be monitored in a vehicle such as a satellite are converted into digital words (six to eight-bit quantization is commonly used) and multiplexed to a common channel. Prior to application to the analog-to-digital converter, the analog signals are conditioned and normalized to some range, such as 0–5 volts. Many of the points monitored may be digital discrete signals such as GO, NO–GO signals. The digital discrete signals and the digital output signals from the analog-to-digital converter form a serial bit stream which is applied as the modulation signal to a transmitter and the information is transmitted. One pass through all the data points is known as a frame and is preceded by a frame synch word.

Various code formats are in use in Pulse Code Modulation systems (hereinafter referred to simply as PCM) of which NRZ (non-return-to-zero) and split-phase are typical. The characteristics of NRZ signals are: (1) the DC level depends on the data and (2) the fundamental signal frequency band is from DC to one-half the bit-rate. The characteristics of split phase signals are: (1) the DC level is independent of the data and (2) the fundamental signal frequency band is from one-half the bit-rate to the bit rate. For NRZ, the state of a bit (0 or 1) is represented by a level, such as +V for 1 and –V for 0. No transistions or spikes occur between bits of like state. For split phase, the first half bit-time is the same as for NRZ, and a transition (from one level to the other) occurs in the center of the bit-time, the level for the second half bit-time being opposite that for the first half.

At the receiving station, the signal is picked up by a receiver and the signal is detected. At the detector output, the signal may not be a well defined square waveform. The transitions may be rounded due to channel bandwidth limitations, an unknown DC level may be present, and, since both the transmitting and receiving equipment may contain tape recorders, wow and flutter may be present. Noise may also be present.

Thus, apparatus is required whose function is to regenerate the bit-rate timing, or clock signal, and to reconstruct the data from this signal. This apparatus is a special type of analog-to-digital converter. Its output is supplied to digital equipment in which the frame synch is re-established and the data decommutated. The apparatus which regenerates the bit rate timing, or clock, and reconstructs the data may be known as a Signal Conditioner and Bit Synchronizer.

Two basic methods of reconstructing the data are (1) filter and sample, and (2) integrate and dump. A third possible method of data reconstruction is by cross correlation.

In the filter and sample method, the signal is filtered and sampled at the center of a bit-time for NRZ. If the sample is greater than the baseline of the signal, the data is considered to be a "1," and if less than the baseline, a "0." If the signal is driven below the baseline by noise when it is actually a "1" (or vice versa) an error in detection results.

In the integration method, the signal is integrated over a bit period. If the result is positive (with respect to some reference), the data is considered to be a "1" and if negative, a "0." The "0" and "1" may be interchanged in the above descriptions.

In the cross correlation method, the incoming signal is multiplied by a reference and the product is integrated over n-bit times. If the reference is of the same waveform as the signal and the two are in phase, a maximum correlation function is obtained. Cross correlation has been mathematically proven to be an optimum method of extracting information from a noisy signal. Thus, a reduction in the probability of error (versus signal-to-noise ratio) in the reconstruction of PCM data can be realized by cross-correlating the data over several bit-times as compared to integrating over one bit-time. Basically this is due to the fact that the average value of the noise is zero, and the longer the integrating interval, the closer the integrated output will be to zero due to noise at the input.

Prior art systems reconstruct the clock signal with phase lock loops which are highly susceptible to noise. These prior art phase lock loops utilize a reference waveform of such a nature that its zero crossings are made to coincide with transitions of the incoming signal. They respond to the first transition of a bit period and apply a frequency (or phase) correction. Thus, extraneous transitions due to noise always give the appearance that the signal frequency is too high and the reference frequency is "driven-off" in the phase lock loop. The present invention overcomes this difficulty inasmuch as it has the capability to average the perturbations of the zero crossings thus appreciably reducing the effect of the noise.

SUMMARY

The digital communication system includes a signal conditioner, a phase-lock loop and a data reconstruction unit. The signal conditioner operates with sampling techniques and establishes a known DC baseline (0 volts) and a known amplitude for a wide dynamic range of the received signal. In so doing it does not respond to noise peaks not does it respond to the message dependent DC level of the received signal.

The phase lock loop also operates with sampling techniques to regenerate the clock signal associated with the received data signal and has the capability of reducing the effect of noise by averaging the perturbations of the baseline crossings caused by the noise.

The data reconstruction unit reconstructs the data by sampling, by integration or by cross-correlation.

It is a therefore object of the present invention to provide a phase lock loop which has the capability of averaging the perturbations of the zero crossings thus appreciably reducing the effect of noise.

BRIEF DESCRIPTION OF THE DRAWINGS

These and other more detailed and specific objects will be disclosed in the course of the following specification, reference being had to the accompanying drawings, in which:

FIG. 8(*b*) illustrates the details of the phase correction circuit used in the Phase Lock Loop;

DESCRIPTION OF THE PREFERRED EMBODIMENT

GENERAL DESCRIPTION

GENERAL RECEIVING SYSTEM

Figure 1:
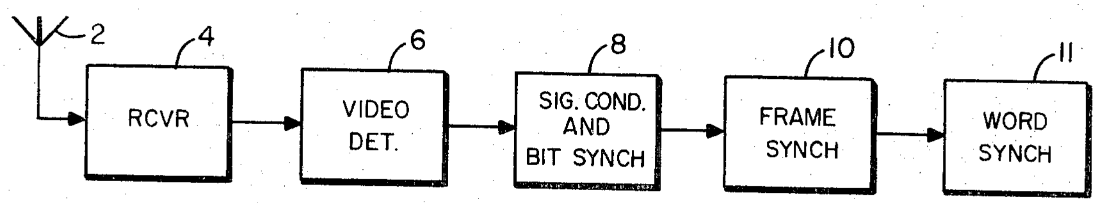
FIG. 1 illustrates a typical PCM receiving system embodying the inventive Signal Conditioner and Bit Synchronizer.

A typical receiving system is shown in FIG. 1 wherein the PCM signal is received by antenna 2 (or transmission line) and coupled to receiver 4 where it is amplified and coupled to video detector 6. As stated previously, the output of the detector 6 is not a well defined square waveform and therefore is coupled to Signal Conditioner and Bit Synchronizer 8 whose function is to regenerate the clock signal and to reconstruct the data. It provides an output which is coupled to frame synchronizer 10 which detects the frame synch word and isolates each frame. The frames are coupled to word synchronizer 11 which isolates each data word.

Figure 2:
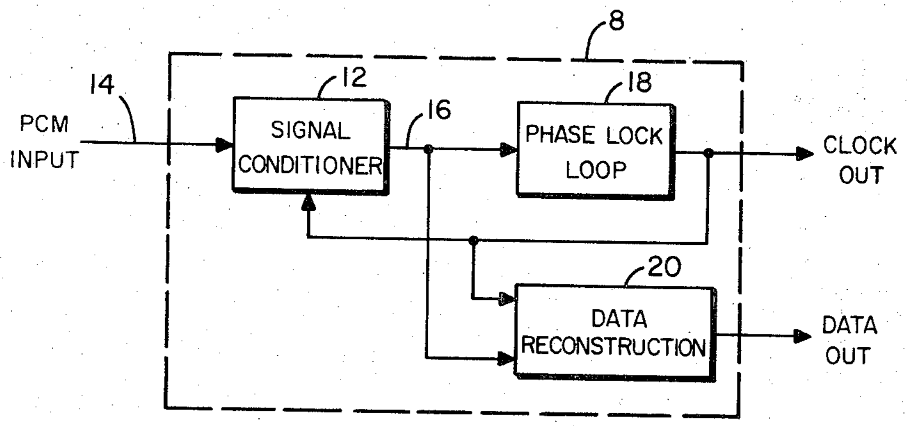
FIG. 2 illustrates the components included in the Signal Conditioner and Bit Synchronizer.

The invention described and claimed herein relates to the Signal Conditioner and Bit Synchronizer 8 which is shown in greater detail in FIG. 2 and consists of a Signal Conditioner 12 which receives the detected or baseband signal on line 14 and produces an output on line 16 of fixed amplitude and a zero volt baseline. The output therefrom is coupled both to Phase Lock Loop 18 and Data Reconstruction Unit 20. Phase Lock Loop 18 produces a clock output signal which is utilized not only by the Signal Conditioner and the Data Reconstruction Unit, but also by the frame and word synchronizers. The present invention is concerned primarily with the phase lock loop portion of the system. The signal conditioner 12 and data reconstruction unit 20 are only described to the extent deemed necessary for a full and complete understanding of the construction, operation and use of the phase lock loop. If desired, a fuller understanding of the signal conditioner can be had by referring to applicant's copending application Ser. No. 14,846 filed concurrently herewith.

SIGNAL CONDITIONER

The purpose of signal conditioner 12 is to properly condition the input signal in order that it might be compatible with the Phase Lock Loop and Data Reconstruction Circuitry 18 and 20 respectively. As stated previously, prior art techniques require the detection of the positive and negative peaks of the signal to establish a baseline. Previous averaging or root mean square (RMS) techniques could not accommodate the wide variations in input frequency, message dependent DC level, DC biases and noise peaks without use of excessive amounts of components. Perturbations of the signal crossings and extraneous transitions due to noise do not seriously effect the operation of the phase-lock loop of the present invention while they may cause other types of mechanizations to rapidly lose synchronization.

Thus the Signal Conditioner 12 receives an input signal consisting of a serial bit stream which is bandwidth limited, i.e., the transitions are rounded, the DC level or baseline varies, and noise is present. Wow and flutter may also be present. Signal Conditioner 12 performs a linear operation on this input signal, i.e., the output signal is a replica of the input signal. The output is held at a constant amplitude over a 20db dynamic range of the input signal, and the baseline is held at 0 volts for input DC levels up to the peak-to-peak signal amplitude. Thus, the output signal is a replica of the input signal except for a change in amplitude and elimination of the DC bias level. This linear operation produces very little degradation of the signal-to-noise (S/N) ratio while nonlinear operations, such as prior art Schmitt trigger type signal conditioners, often cause considerable degradation of the S/N ratio. The signal conditioner also has provisions for accepting inputs of various impedance levels (50, 600, 5,000 ohms) AC or DC coupling, a manual DC level adjustment, 12db of manual gain control in three db steps, and a bank of low pass constant delay filters.

PHASE LOCK LOOP

The phase lock loop utilizes sampling techniques to produce the phase lock. It is controlled by sampling the in-phase (I) and quadrature (Q) components of the signal conditioner output (with respect to a reference). Phase lock is obtained by driving the Q-sample to zero volts. Loop bandwidth is manually variable over a 16-to-1 range in binary steps. No explicit baseline or transition detection is required. There is no sharp drop off in performance if some specific maximum number of bit times occur without transitions. Of course, performance improves as the percentage of transitions increases. The loop inherently seeks correct synchronization of split-phase type signals, which will be explained hereafter, excluding the possibility of synchronizing one-half bit-time out. Of course, the above statements do not apply for a DC level or NRZ signals or a continuous sine wave input for split-phase signals. Some information must be present in the signal for the loop to function.

A second method of phase-lock control utilizes integration. Integrators integrating up to a full bit period may be substituted for the I- and Q-samplers. The integration period of the I-integrator would be centered about the I-sample time and the integration period of the Q-integrator would be centered about the Q-sample time. The phase lock loop is controlled as in the sample method utilizing the polarities of the integrator outputs at the end of the integration period in place of the sample polarities as described above for the sampling method. This integration method for an integration period of zero time (very short) reduces to the sampling method.

A third method of phase lock utilizes early and late gate pulses which occur just before and just after the expected transition times. If a transition occurs in the early gate, a voltage controlled oscillator (VCO) frequency is increased. If it occurs in the late gate, the VCO frequency is decreased. Actually the number of transitions occurring in each gate are counted, and the criteria as to which way to change the frequency is based on the gate having the most transitions. Thus, this method has ability to average or reject noise and also provides a very tight phase lock.

DATA RECONSTRUCTION UNIT

Although data reconstruction by sampling is available at the output of the I-sampler in the phase lock loop 18 for NRZ data, data reconstruction by integration over one bit-period is provided for NRZ, by cross-correlation over one bit-period for split phase and by cross correlation over two bit-periods (up to n-bit-periods) for NRZ and split phase with the data reconstruction unit 20. Interlaced integrators are provided to permit integration over a full bit-time. While one is integrating, the other is being dumped. The improvement in performance obtainable by integrating over several bit times is given in a paper by A. J. Viterbi, "On-Coded Phase-Coherent Communications," IRE Transactions, PG on Space Electronics and Telemetering, March 1961, page 3,014.

DETAILED DESCRIPTION

Figure 4:
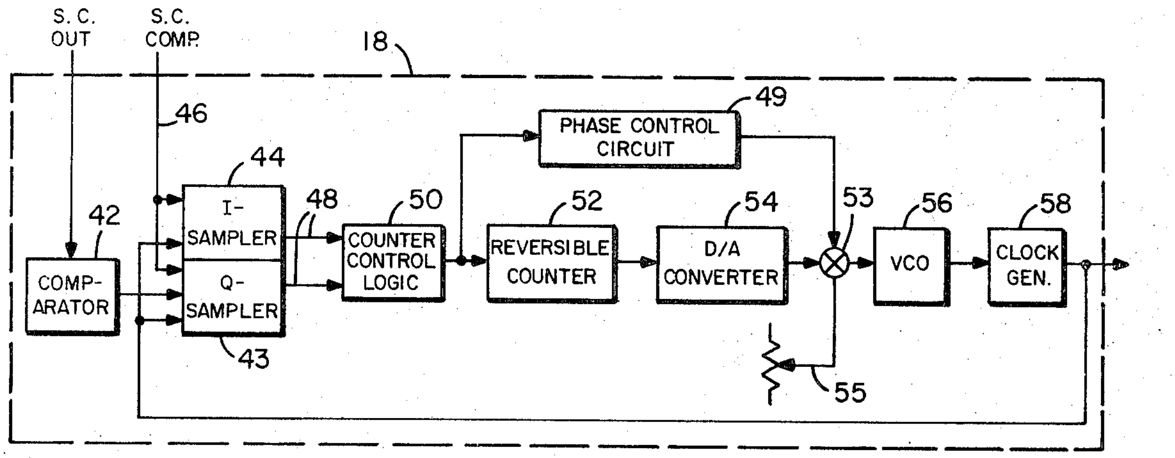
FIG. 4 illustrates the details of the preferred embodiment of the Phase Lock Loop utilizing sampling techniques.

The preferred embodiment of phase lock loop 18 is shown in FIG. 4. Comparator 42 receives the output signal from the signal conditioner and compares it with predetermined positive and negative threshold voltages to produce signals indicative of whether the input is greater than or less than these thresholds.

I-sampler 44 receives a zero volt threshold output from the comparator in the signal conditioner on line 46 which indicates whether the signal is positive or negative. As will be more particularly explained, it also receives clock pulse $C_2$ for splitphase or clock pulse $C_3$ for NRZ and produces a "1" output if the input signal is positive at the time of the clock pulse and a "0" output if the signal is negative at the time the clock pulse is applied.

The Q-sample 43 receives both the output from comparator 42 and the zero volt threshold output from the signal conditioner comparator on line 46 as well as clock pulse $C_1$ for NRZ or clock pulse $C_3$ for split-phase and produces a first output signal which is a "1" if the input signal is positive at the time of the clock pulse or a "0" if the input signal is negative at the time of the clock pulse and a second output signal which is a "1" if the input signal amplitude is outside a coarse correction range at the time of the clock pulse and a "0" if the input signal amplitude is within a coarse correction range at the time of the clock pulse. The sampler outputs are coupled to counter control logic 50. The phase lock loop (PLL) must control both the frequency and the phase of a voltage-controlled oscillator (VCO) to pull the output from the VCO into synchronism with an incoming data signal. Thus, the phase lock loop must be a proportional-plus-integral control loop, i.e., a correctional signal proportional to the error plus a signal which is the integral of the error is required.

Figure 8A:
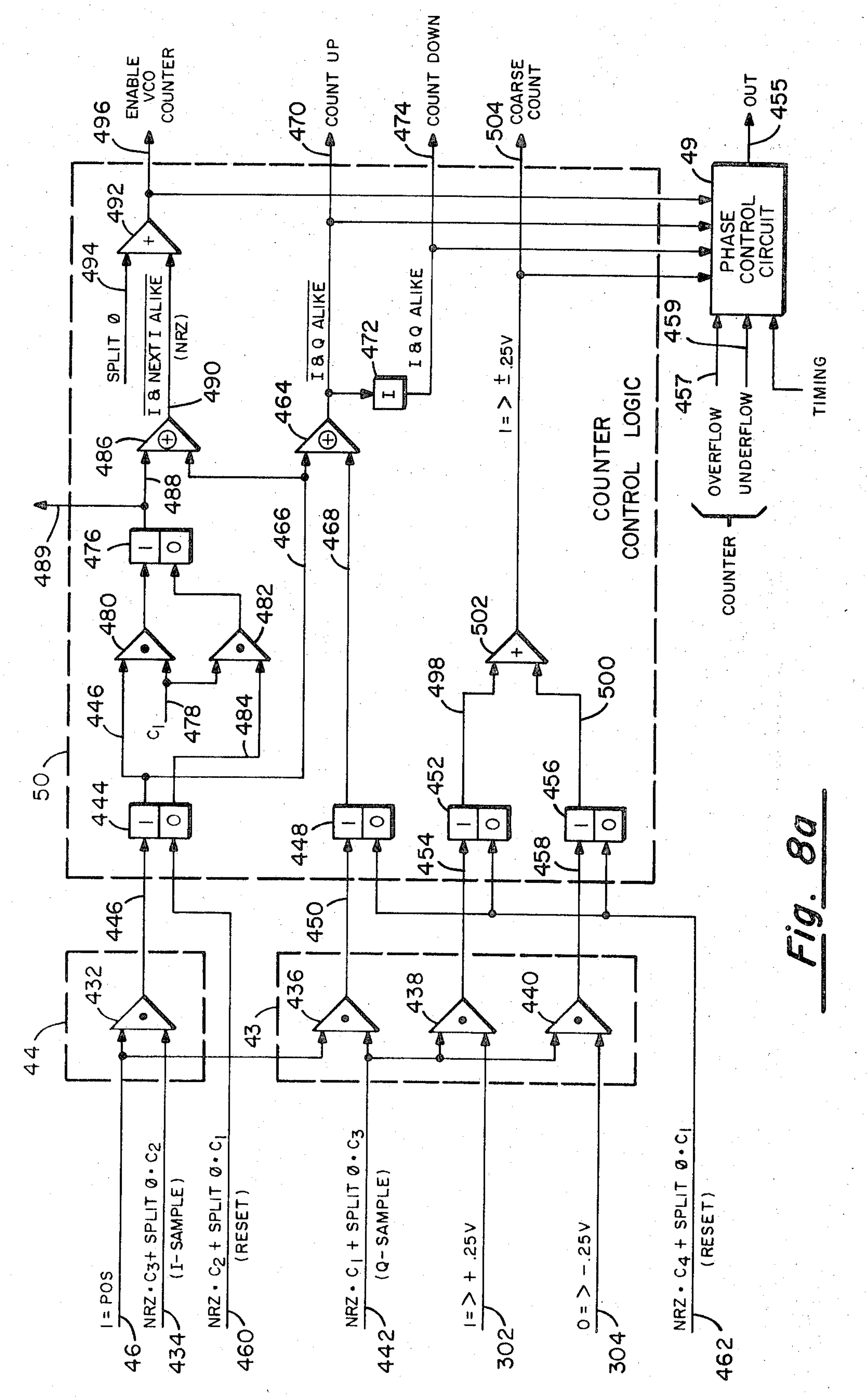
FIG. 8(*a*) illustrates the counter control logic used in the Phase Lock Loop.
Figure 8B:
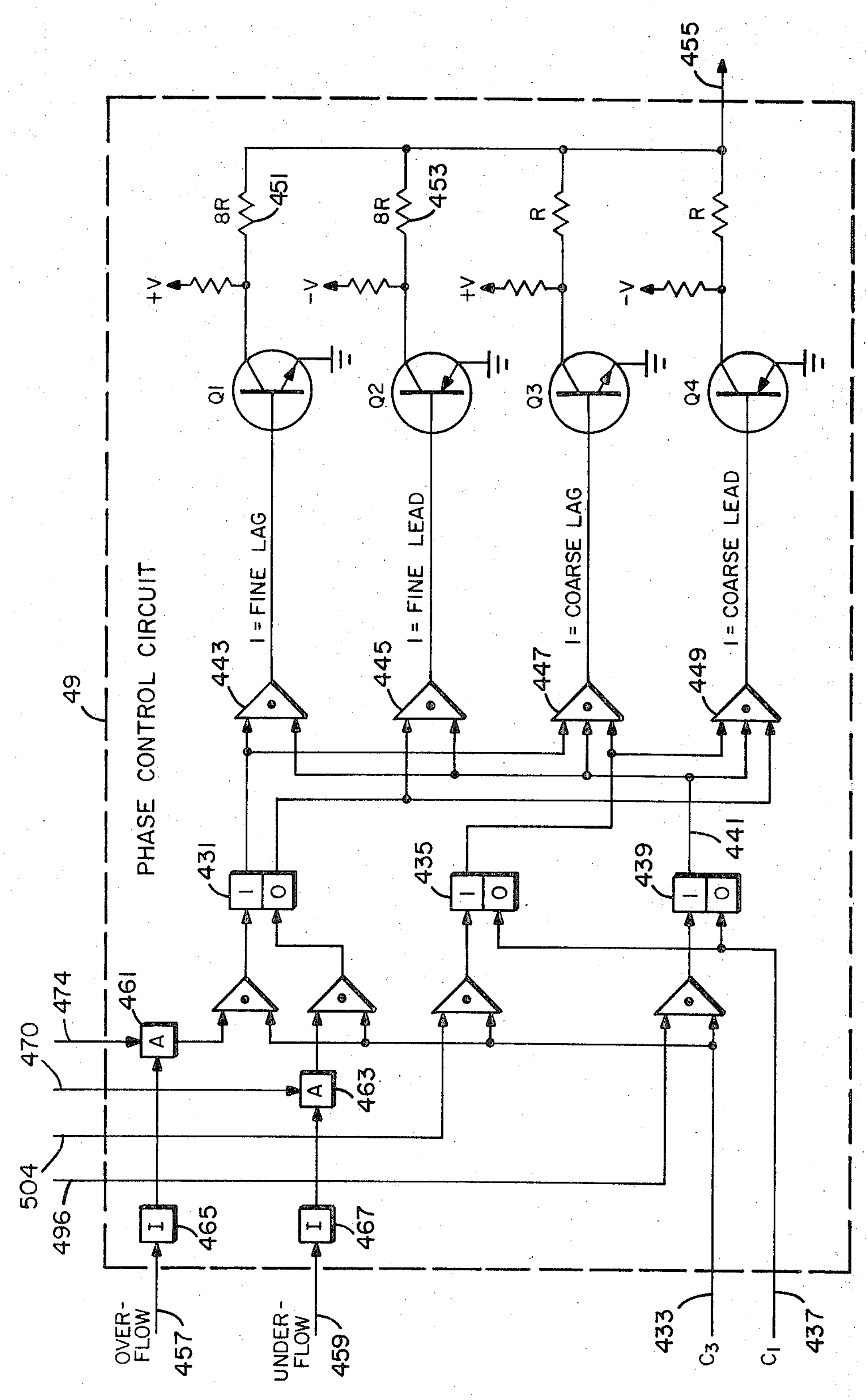

In FIG. 4, reversible counter 52 and the D/A converter 54 form an integrator, i.e., the circuit which provides the signal which is the integral of the error, and circuit 49, shown connected to the counter control logic 50 in FIG. 8($a$) and shown in detail in FIG. 8($b$), is used to provide the phase or proportional control signal.

It is the purpose of the integrator to accumulate a signal which compensates for the frequency offset error in the initial setting of the VCO frequency. It is for this reaspn that the integral control signal may be considered to be a frequency control signal. Phase lock is obtained by driving the timing of the samples so that the Q-sample is of zero amplitude.

Figure 3A:
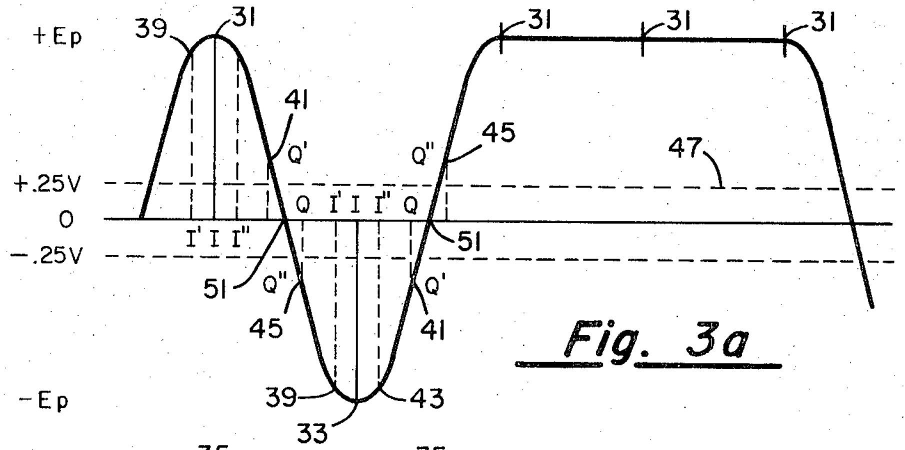
FIG. 3(*a*) and (*b*) illustrates with NRZ and split-phase waveforms how sampling techniques are performed in the Phase Lock Loop and FIG. 3(*c*) illustrates the signals produced by a four phase clock.
Figure 3B:
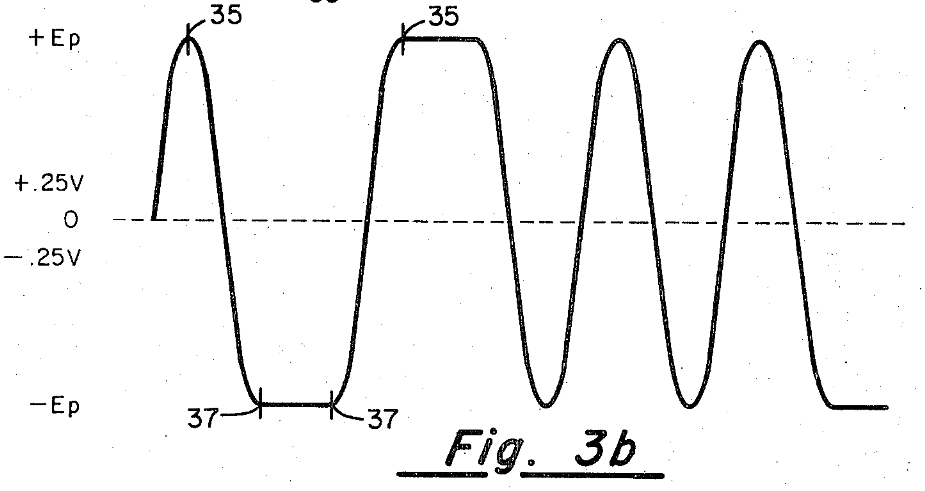
Figure 3C:
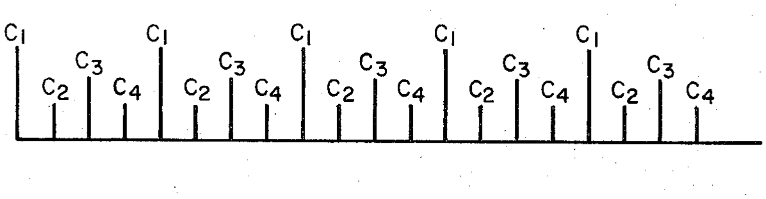

Referring to FIG. 3($a$), for NRZ if the signal leads the input data, the I-sample will occur at point 39 which is represented as I′ and the Q-sample would occur at point 41 which is represented by Q′. This "lead" condition is indicated by both I′ and Q′ samples being of like polarity.

If the clock signal lags the data signal the I-sample will occur at point 43 designated by I″ and the Q-sample will occur at point designated as Q″. This "lagging" condition is indicated by the Q- and I-samples being of opposite (or unlike) polarity.

These signals, "I and Q alike" and "I and Q unlike," are outputs of the counter control logic 50 which are applied to reversible counter 52 and phase control circuit 49. The "I and Q alike" signal causes the counter to count in a first direction while the "I and Q unlike" signal causes the counter to count in a second direction. The state of the counter is then converted to an analog voltage by a conventional D/A converter 54 which, in turn, provides the frequency control signal for the voltage controlled oscillator 56 through summation unit 53.

The phase control signal may be developed by shifting the frequency of the VCO for a period of time and returning the frequency to the initial value at the end of the period. Increasing the frequency produces a phase lead and qecreasing it produces a phase lag.

The frequency of the VCO is changed by summing a voltage out of the phase control circuit 49 with the VCO input frequency control signal from D/A converter 54 over a portion of a bit-time. The last half bit-time, from $C_3$ to $C_1$, is used since this is compatible with the other logic timing requirements for both NRZ and split-phase operation.

The logic signals required for the phase control circuit 49 are the same as those required for the frequency control circuit, i.e., the reversible counter 52 and D/A converter 54. Whenever a frequency increase is made, a phase lead is applied and when a frequency decrease is made, a phase lag is applied. Whenever the frequency correction is fine, the phase correction is also fine. Similarly, whenever the frequency correction is coarse, the phase correction is also coarse.

As can be seen in FIG. 4, summation unit 53 receives not only the frequency control signal from D/A converter 54 and the phase control signal from circuit 49 but also a signal from potentiometer 55 which enables manual control or adjustment of the VCO frequency.

The output of VCO 56 is coupled to clock generator 58 which produces clock pulses $C_1$, $C_2$, $C_3$ and $C_4$ as well as other clock signals as will be further described in the section entitled "Clock Generator."

If a Q-sample greater than the coarse correction range (as determined by a positive and a negative threshold) is detected, a coarse correction is made by applying the count to a more significant bit of the counter.

With NRZ if no transition occurs, the Q-sample will be large even though the loop is in sync and no correction is to be applied. This situation is detected by observing the next I-sample. If it is of the same polarity as the previous I-sample, no transition has occurred and no correction is to be applied. Note that the only frequency and phase control information is in the transitions and a loop correction must be made whenever and only when a transition occurs.

The control logic for split-phase for increasing or decreasing the frequency is the same as for NRZ. Since a transition occurs in the center of every bit-time, it is not necessary to detect the occurrence of a transition when applying a correction. At stated previously, I- and Q- samples are taken at the clock times $C_2$ and $C_3$ respectively. If the loop is one-half bit-time out of sync, a large Q-error will be detected when there is no transition between bits and a coarse correction will be applied to the loop driving it away from the one-half bit-time out-of-sync condition toward the true sync condition. I- and Q- samples could also be taken at the clock times $C_4$ and $C_1$ respectively with the correction logic identical to that for NRZ. However, this would result in an inherent ambiguity in the operation as to whether the loop was in sync or one-half bit-time out of sync. If the mechanization required making an explicit decision as to whether it was in-sync or one-half bit out-of-sync, an erroneous decision would cause the loop to go out-of-sync when it was in sync and a bit-slippage would result. This is one of the problems of the prior art which is avoided by omitting the use of clock pulses $C_4$ and $C_1$.

Previous discussions of the loop operation are based on the assumption that the clock frequency is the same as the data rate. Prior to acquisition, there is a difference between the clock frequency and the data rate. A beat note analogy is useful in explaining acquisition. If the instantaneous phase relationship between the clock signal and the data is less than ±90°, the control logic will function properly and pull-in on frequency. If the instantaneous phase relationship is ±90°–180°, the control logic is reversed and the loop will drive-off the frequency. Then, as the beat note approaches the in-phase condition, the correct logic action takes place and the loop then pulls-in whereby clock frequency of clock pulses become the desired clock signals with a frequency of the data rate.

In the case of logic reversal, the counter will count to its maximum upper or lower limit. This condition is used to inhibit further counting in this direction, thus limiting the range in which frequency may be driven off. Then when the in-phase condition reappears, the correct logic action results.

Coarse correction corresponds to wide loop bandwidth. The wider the loop bandwidth, the faster the acquisition rate, the greater the pull-in range, and the greater the susceptibility to noise, and vice versa. Five loop-bandwidths are manually selectable in binary increments. The widest bandwidth provides a pull-in range of plus or minus 10 percent. Regardless of the loop bandwidth setting, a least significant bit (LSB) correction is applied for Q-errors less than a predetermined threshold. This provides maximum resolution for all bandwidths. The mechanization of the reversible counter is such that loop bandwidth may be changed after acquisition without losing track.

In summary, the phase lock loop utilizing the sampling method consists of a voltage controlled oscillator the frequency of which is caused to pull into synchronization with the incoming bit-rate with nearly zero degrees phase error. Samples of the input signal are taken in-phase (I-sample) with the fundamental frequency and 90° out-of-phase (Q-sample) with the fundamental frequency. The action of the loop is to drive the Q-sample to zero. If an I-sample and the following Q-sample are of like sign, the VCO frequency is reduced and if they are of opposite sign, the VCO frequency is increased. When an error is detected, a reversible counter in the integrator or frequency control circuit is caused to count up or down depending upon whether it is desired to increase or decrease the frequency. The output state of the counter is converted to a voltage which is applied to the VCO through summation unit 53.

The same error signals cause phase lead or lag correction signals to be produced by the phase correction circuit 49 which are also applied to the VCO through summarion unit 53. Step-proportional control is provided by applying a coarse correction if the Q-sample is greater than some predetermined threshold and a fine correction for errors less than the threshold. Obviously, multistep control, e.g., coarse, medium, fine, etc., could be used if desired. As in the case of AGC and DC level control loops, the phase lock loop will be stable if the loop signals settle after a correction is applied before a sample is taken.

Figure 5:
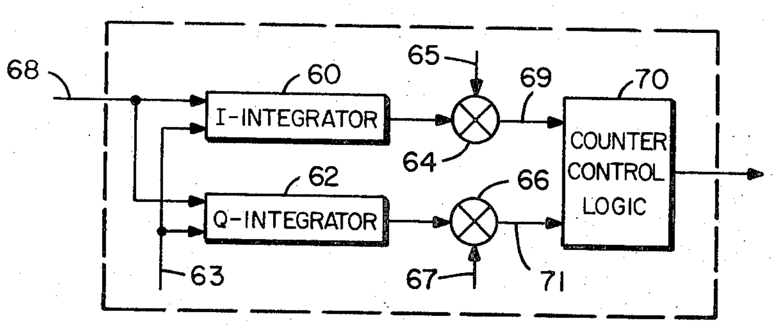
FIG. 5 illustrates a portion of the Phase Lock Loop utilizing integration techniques.

As stated previously the phase lock loop can also operate on a second method which utilizes integration as shown in FIG. 5. Integrators 60 and 62 integrating the input signal from the Signal Conditioner on line 68 up to a bit-period may be substituted for the I- and Q- samplers respectively. The integration period of the I-integrator would be centered about the I-sample time and the integration period of the Q-integrator would be centered about the Q-sample time by the proper timing waveforms on line 63. At the end of the respective integration periods, their outputs are compared to ground on lines 65 and 67 by comparators 64 and 66 to determine whether they are positive or negative. The outputs of the comparators on lines 69 and 71 are coupled to Counter Control Logic 70 which produces output signals that are used to control the phase lock loop in a manner identical to that disclosed for the sampling method. For integration over a full bit-time, integrators may be interlaced in the I- and Q-channels in order that one may be dumped while the other is integrating.

Figure 6A:
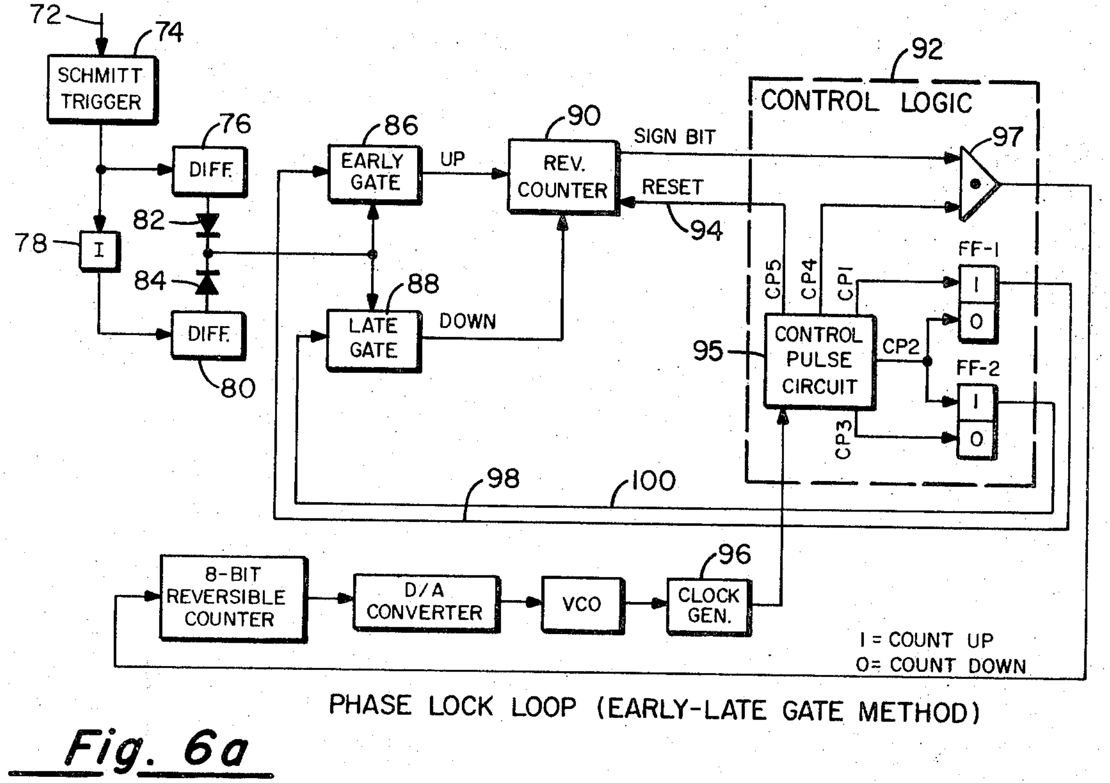
FIG. 6(*a*) illustrates the Phase Lock Loop utilizing early-late gate techniques.
FIG. 6(b) illustrates waveforms used to explain FIG. 6(*a*)
Figure 6B:
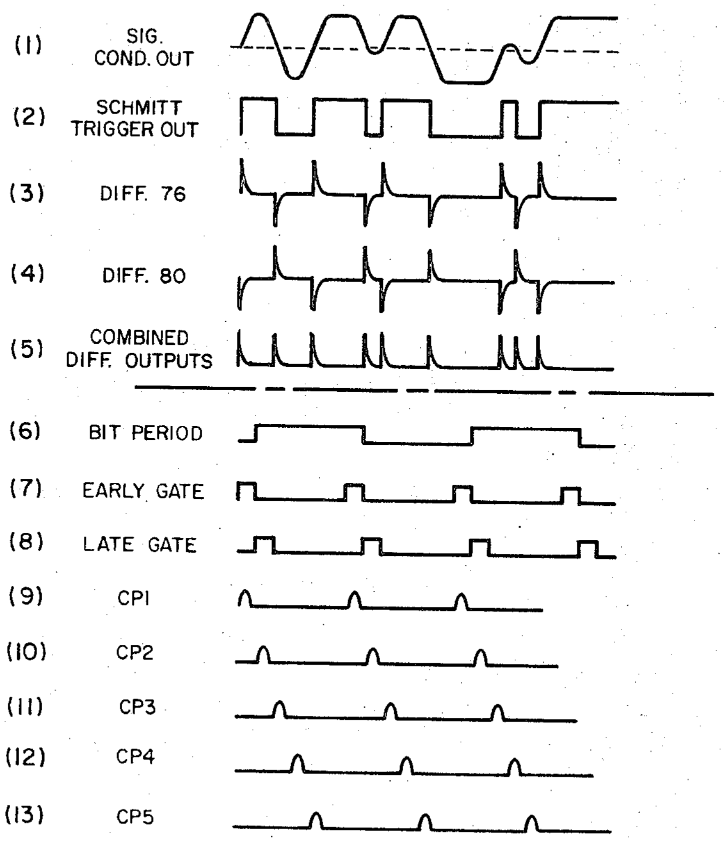

As stated earlier, a third method of obtaining phase lock utilizes early and late gates. As is fully explained in the aforedescribed copending application Ser. No. 14,846, in the signal conditioner, the baseline is detected and the signal is compared to the baseline. A pulse is produced whenever the signal crosses the baseline. The baseline is held at zero volts as shown in waveform (1) in FIG. 6(*b*) and thus the signal would be compared to zero volts for ground. As shown in FIG. 6(*a*), the output of the Signal Conditioner on line 72 is applied to a squaring circuit such as a Schmitt trigger 74 to provide sharp transitions as shown by waveform (2) in FIG. 6(*b*). The output of trigger 74 is coupled to differentiator 76 and inverter 78. Differentiator 76 produces an output train of pulses as shown by waveform (3) in FIG. 6(*b*). The output from inverter 78 is applied to differentiator 80 which produces an output train of pulses as shown by waveform (4) in FIG. 6(*b*). Diodes 82 and 84 pass only positive pulses to produce a train of positive pulses as shown by waveform (5) in FIG. 6(*b*) each of which represents a crossing of the baseline. These pulses are applied to early gate 86 and late gate 88.

The early gate 86 is enabled for a short time prior to an expected transition of the signal period. The late gate 88 is enabled for a short time an equal amount of time after expected transition. Thus waveform (6) in FIG. 6(*b* ) shows the expected bit-period while waveform (7) and (8) respectively show the enabling pulses for the early and late gates.

Transitions which occur when early gate 86 is enabled cause reversible counter 90 to count in a first direction and those occurring when the late gate is enabled cause counter 90 to count in an opposite direction. Thus, at the end of the late gate enable pulse, the output of counter 90 indicates in which gate, if any, the most transitions occurred. If more transitions occur in early gate 86, the VCO frequency must be increased as when the I- and Q-samples were of unlike polarity in the other methods. If more transitions occur in late gate 88, the VCO frequency must be decreased as when the I- and Q-samples were of like polarity in the other methods. This is accomplished by generating counter control signals in counter controlled logic 92. Thus, reversible counter 90 provides a method of averaging noise. Reversible counter 90 is reset by a signal on line 94 prior to the start of the next early gate. Control logic 92 differs from control logic 50 shown in FIG. 4 in the following manner. Control pulses (CP) are derived from the output of clock 96. Control pulse circuit 95 can be any well known circuit which produces waveforms 9–13 shown in FIG. 6(*b*). FF–1 in control logic 92 is set by CP1 and reset by CP2. FF–2 is set by CP2 and reset by CP3. Thus, early and late gate pulses are formed on lines 98 and 100 respectively with the late gate starting at the end of the early gate as illustrated by waveforms 7 and 8 in FIG. 6(*b*). An early and late gate pulse occurs each bit-time.

Pulses corresponding to the transitions of the signal conditioner output are shown by waveform 5 in FIG. 6(*b*). Those which occur during the early gate indicate that the VCO frequency is high and those occurring during the late gate indicate that it is low. In the presence of noise, more than one pulse may appear at the output of the signal conditioner each bit-time. Pulses occurring during an early gate cause reversible counter 90 (which may comprise 2 or 3 stages) to count up and pulses occurring during the late gate cause it to count down. At the end of the late gate the most significant bit of this counter indicates whether more pulses occurred during the early or the late gate. CP4, which occurs just after the end of the late gate, enables AND gate 97 which couples the MSB of the early-late gate counter to the UP-DOWN control of the phase lock loop 8-bit reversible counter. The output of the 8-bit reversible counter controls the frequency correction.

CP5 resets the early-late gate counter, the MSB to "1" and all other bits to "0" or vice versa, prior to the start of the next early gate.

The width of the early and late gates may be varied by changing the timing of CP1 and CP3. Adjusting them closer to CP2 makes the gates narrower and vice versa. Thus, the output of control logic 92 is used to control a clock generator 96 through a reversible counter, D/A converter, phase control circuit 49 and VCO as previously described with respect to FIG. 4. It also produces the enabling signals for the early and late gates on line 98 and 100 respectively.

COMPARATORS

Figure 7:
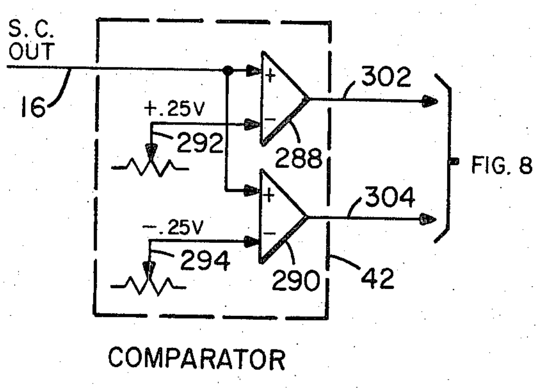
FIG. 7 is a circuit diagram of the comparators used in the Phase Lock Loop.

Comparator 42 shown in FIG. 4 is shown in detail in FIG. 7. The (+) signs on the amplifiers in FIG. 7 represent non-inverting inputs, and the (−) signs the inverting inputs. Comparator 42 is utilized in the phase lock loop and comprises two high gain differential amplifiers 288 and 290. The signal conditioner output on line 16 is coupled to the non-inverting side of each of the amplifiers 288 and 290. Differential amplifiers 288 and 290 are used in determining whether the input signal is within the coarse correction range. The range is determined by positive and negative threshold which are set by adjustable arms 292 and 294 respectively. As shown in FIG. 3(*a*) for purposes of example only, these thresholds may be +0.25 and −0.25 volts respectively. The outputs of amplifiers 288 and 290 on lines 302 and 304 are coupled to Q-sampler 43.

The output of each of amplifiers 288 and 290 are positive (representing a binary 1) whenever the input signal is positive with respect to its associated reference or threshold voltage and zero (representing a binary 0) whenever the input signal is negative with respect to its associated reference or threshold voltage. The outputs may be between the "0" and "1" levels for inputs very nearly equal to the associated thresholds. A bistable device such as a Schmitt trigger could be included in the output lines to prevent the output from remaining between the "1" and "O" levels, but this is not essential for the purposes of this invention.

COUNTERS

Reversible (up - down) counters are used in the phase lock loop to accumulate loop correction signals. The counters are not of the ripple type, whereby a pulse is applied to the least significant bit (LSB) causing it to change state and is then passed to the next higher bit if the given bit is a "1" for an UP counter or a "0" for a DOWN counter.

In the present counters, all appropriate stages of the counter change states simultaneously when a count pulse is applied. The logic criteria for counting is to complement the LSB and to complement other bits if all lower significant bits are "1's" for UP counts or "0's" for DOWN counts. A two phase clock signal is required. The first phase $t_1$, causes a first flip flop of each stage to store a count according to the above described logic. The stage of the first flip flop in each stage of the counter is shifted into a second flip flop in each stage at phase, $t_2$, time. The outputs of this second flip flop are used to control the inputs to the first flip flop of the counter stage such that it (the first flip flop) will change stages when the first phase $t_1$ and the correct logic conditions exist. UP or DOWN command signals are applied to each stage as generated by control logic 50 shown in FIG. 4. If neither an UP nor a DOWN command signal is present, the counter will not count. The states of all stages are monitored to detect overflow (all 1's) and underflow (all 0's). The overflow signal is used to inhibit the counter from counting UP and the underflow signal to inhibit counting DOWN.

I-Q-SAMPLER AND COUNTER CONTROL LOGIC

As previously described with reference to FIG. 3, the phase-lock loop logic utilizes I- and Q-samples such that if an I-sample and the following Q-sample are of like sign indicating the VCO frequency is "leading" the data, the VCO frequency is to be reduced. If the I- and the following Q-sample are of opposite sign indicating that the VCO frequency is "lagging" the data, the VCO frequency is to be increased. For NRZ, the correction is to be applied if and only if the next I-sample is of opposite sign to the immediately preceding I-sample. If the Q-sample exceeds a predetermined threshold, a coarse correction is to be applied.

I-SAMPLER

As shown in FIG. 8, I-sampler 44 is merely an AND-gate 432 which has as one input a signal from the comparator utilized in the signal conditioner which operates to indicate the polarity of the signal conditioner output at any given time. The I-sample pulse (as described by the Boolean Algebra equation NRZ. $C_3$+ split phase . $C_2$) is applied to line 434 to provide sampling at the peaks described previously.

Q-SAMPLER

As shown in FIG. 8, Q-sampler 43 comprises AND-gate 436, 438 and 440. AND-gate 436 has as one input the same signal as applied to AND-gate 432 previously described. AND-gate 438 has as one input a signal on line 302 which is the output from differential amplifier 288 in FIG. 7 which is part of comparator 42 in FIG. 4.

AND-gate 440 has as one input a signal on line 304 which is the output from differential amplifier 290 in FIG. 7 which is part of comparator 42 in FIG. 4.

Each of these AND-gates 436, 438, and 440 have as the other input a Q-sample signal on line 442 which is described by the Boolean Algebra equation NRZ · $C_1$ + split phase · $C_3$.

COUNTER CONTROL LOGIC

The output of AND-gate 432 in I-sample circuit 44 shown in FIG. 8(a) is coupled to the SET input of flip flop 444 in counter control logic 50 via line 446. Also, the output of AND-gate 436 in the Q-sample circuit 43 is coupled to the SET input of flip flop 448 via line 450. In a like manner, the output of AND-gate 438 in Q-sample circuit 43 is coupled to the SET input of flip flop 452 via line 454 while the output of AND-gate 440 is coupled to the SET input of flip flop 456 via line 458. Flip flop 444 is RESET each bit-time by a signal on line 460 according to the Boolean Algebra equation NRZ · $C_2$ + split phase · $C_1$. Flip flops 448, 452 and 456 are also RESET each bit-time by a signal on line 462 according to the Boolean Algebra equation NRZ · $C_4$ + split phase · $C_1$.

If the I- and Q-samples are positive, flip flops 444 and 448 are SET and, if negative, they remain RESET. The outputs of the SET side of flip flops 444 and 448 are applied to EXCLUSIVE-OR circuit 464 via lines 466 and 468 respectively. Thus, EXCLUSIVE-OR gate 464 will produce a "1" output on line 470 when the I- and Q-samples are opposite and a "0" output when they are alike. The output of EXCLUSIVE-OR gate 464 is also applied to inverter 472. Therefore a "0" on line 470 will cause inverter 472 to produce a "1" on line 474. These signals on line 474 and 470 are used to cause the counter to count UP and DOWN as will be explained later in the section entitled "Counter."

Flip flop 476 in conjunction with flip flop 444 from a shift register such that when clock pulse $C_1$ on line 478 is applied to AND-gate 480 and 482 respectively, the data in flip-flop 444 is transferred to flip flop 476 via lines 466 and 484. The outputs of flip flop 444 and 476 are coupled to EXCLUSIVE-OR gate 486 via lines 466 and 488. Thus EXCLUSIVE-OR gates 486 produces a "1" output on line 490 when two successive I-samples of unlike polarity occur and a "0" output when the two successive I-samples are of like polarity. The signal on line 490 is' supplied as one input to OR-gate 492. A "1" is applied to OR-gate 492 on line 494 during split phase operations and a "0" during NRZ operations. The output of OR-gate 492 on line 496 is used to control reversible counter 52 in the phase lock loop shown in FIG. 4. When in split phase operation, a "1" will be present on line 496 in enabling the counter to respond to signals on lines 470 and 474. When in NRZ operation, a one will appear on line 496 whenever two consecutive I-samples are opposite thus enabling the counter to respond to signals on line 470 and 474. Conversely if two consecutive I-samples are alike, a "0" appears on line 496 which inhibits the counter from responding to the signals on lines 470 and 474. (Note that two consecutive I-samples will be unlike if a transition occurs between them and will be alike if no transition occurs between them. The frequency correction circuitry must be inhibited when no transition occurs for NRZ and enabled at all times for split phase since a transition occurs every bit time.)

Whenever flip flop 452 is SET or 456 is RESET, they produce coarse correction signals on lines 498 or 500 respectively. These outputs are coupled to OR-gate 502 which produces an output on line 504 that is utilized to cause coarse corrections to be made by the counter as will be explained in the following subsection.

Phase correction circuit 49 is shown receiving the output signals present on lines 470, 474, 496, and 504 from the Counter Control Logic as well as proper timing signals $C_1$ and $C_3$ and overflow and underflow signals from reversible counter 52. These overflow and underflow signals inhibit operation of the phase correction circuit 49 whenever counter 52 is inhibited.

COUNTER

An 8-bit reversible counter is used in the phase-lock loop. Each stage of the counter is basically identical to the individual stages of the counter previously discussed in relation to the signal conditioner. However, provisions are made for applying the count signals from the counter control logic to stages other than the least significant stage. For widest loop-bandwidth, when a coarse count command is present, the coarst count is applied to the most significant stage for which provisions are made to apply a coarse count. For narrower bandwidths, the coarse count is supplied to lower significant stages. In the present invention, loop bandwidth is controlled manually but could be controlled automatically. Also in the present invention provisions are made for applying the coarse count to any of the five least significant stages.

Figure 9:
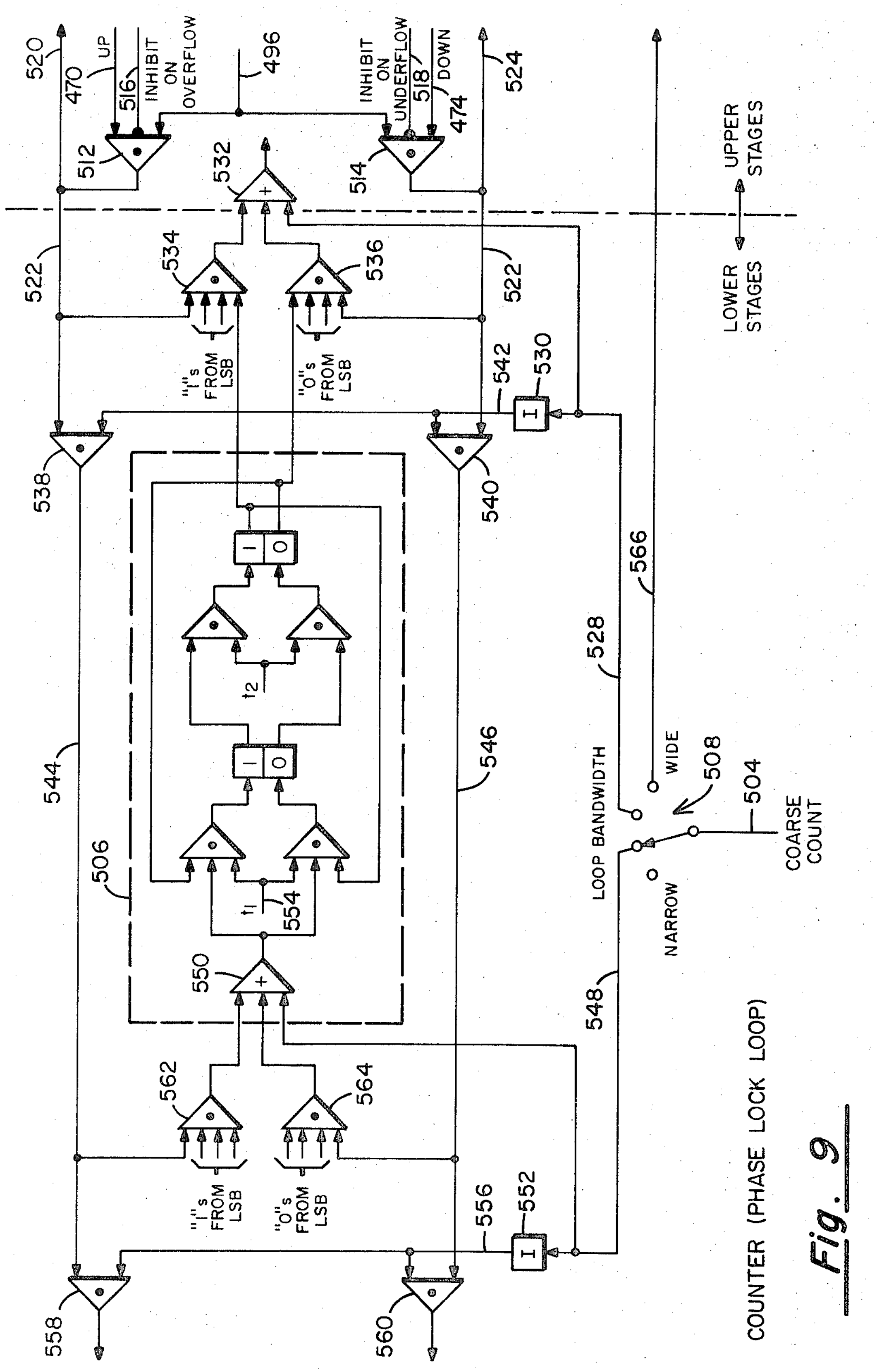
FIG. 9 illustrates the logic of a typical least significant bit stage of the counter used in the Phase Lock Loop.

Stage 506 and its associated control circuitry represent a typical one of the LSB stages and is shown in FIG. 9. The upper significant bit stages are identical to the stages of the counters previously discussed. The counter functions generally as described previously except for the manner in which the UP and DOWN commands are applied. UP and DOWN signals on lines 470 and 474 respectively from the counter control logic 50 in FIG. 8 are coupled to AND-gates 512 and 514 respectively. As previously explained, the UP and DOWN commands may be inhibited by signals on lines 516 and 518 respectively to AND-gates 512 and 514 respectively. Also the "ENABLE VCO counter" signal on line 496 in FIG. 8 is also coupled to both AND-gates 512 and 514.

The output of AND-gate 512 is coupled to the MSB stages via line 520 and to LSB stages on line 522. In a like manner the output of AND-gate 514 is coupled to the MSB stages via line 24 and to the LSB stages via line 526.

The coarse count on line 504 from OR gate 502 in the counter control logic 50 shown in FIG. 8 is coupled to manual loop bandwidth selector switch 508. With the switch coupled to terminal 510 as shown, stage 506 functions as the LSB of the counter when a "1" is present on coarse count line 504. All of the terminals to which the switch is not coupled have a "0" on their associated conductor. Thus, with the switch in the position shown, line 528 couples a "0" to inverter 530 and OR-gate 532. Thus OR-gate 532 will produce an output which depends upon the signals received from AND-gates 544 and 536. The inputs to AND-gate 534 includes the UP command on line 522 and the "1" outputs of all LSB stages. In like manner, AND-gate 536 has as inputs the DOWN command on line 526 and the "0" outputs of all LSB stages. Inverter 530 produces a "1" output which is coupled as one input to AND-gates 538 and 540 via line 542. Thus the UP command signal on line 522 will appear at the output of ANDgate 538 on line 544 while the DOWN command will appear at the output of AND-gate 540 on line 546. With the switch in the position shown, a coarse count command or "1" present on line 548 is coupled to OR-gate 550 and inverter 552. A "1" will appear at the output of OR-gate 550 causing stage 506 to count whenever a timing pulse, $t_1$, appears on line 554. The output of inverter 552 on line 556 is a "0" which inhibits the UP and DOWN commands from being coupled to lower order stages through AND gates 558 and 560 respectively. Thus lower significant stages will remain in the stage which they were in when the switch was coupled to terminal 510. The function of AND-gates 544 and 562 and 536 and 564 is to couple the UP or DOWN commands to their respective stages whenever all lower stages are producing 1's (for UP commands) or 0's (for DOWN commands). The counter in the phase lock loop requires a two phase clock as described previously. The first phase, $t_1$, is $C_3$ delayed and the second phase, $t_2$, is $C_1$.

When a "0" is present on coarse correction line 504, all stages of the counter are enabled and the LSB stage receives the count. Obviously, wider loop bandwidths may be obtained by coupling lines 66 to a higher order stage.

PHASE CORRECTION CIRCUIT

The phase correction circuit is shown in detail in FIG. 8(*b*). The signals "I and Q alike" on line 474 and "$\overline{\text{I and Q alike}}$" on line 470 from the Counter Control Logic 50 are stored in F/F 431. Timing pulse $C_3$ on line 433 causes the correct signal to be stored at the center of each bit-time and F/F 431 remains in this state until the center of the next bit-time. If the signal "I and Q alike" is present on line 474, this indicates that the VCO frequency is "leading" the input data and, therefore, a "1" is stored which permits phase lag corrections to be applied to the VCO. If the signal "$\overline{\text{I and Q alike}}$" is present on line 470, this indicates that the VCO frequency is "lagging" the input data and, therefore, a "0" is stored which permits phase lead correction to be applied to the VCO. Obviously, the "1" and "0" could be reversed.

If a coarse correction is indicated by a signal on line 504 from the Counter Control Logic 50, F/F 435 is SET when timing pulse $C_3$ is also present on line 433. F/F 435 is RESET when timing pulse $C_1$ is present on line 437.

When in NRZ operation, a phase correction signal is applied to the VCO only if a transition occurs as indicated by successive I-samples of opposite polarity. A control signal is then present on line 496 from the Counter Control Logic 50. For split-phase operation, a phase correction is applied to the VCO every bit-time. Again the control signal is present on line 496. This signal from the Counter Control Logic 50, for either split-phase or NRZ operation, is stored in F/F 439 which is SET by timing pulse $C_3$ on line 433 if a correction is to be supplied and which is always RESET by the $C_1$ timing pulse on line 437. Thus, the output of F/F 439 on line 441 is always "0" during the interval of time between timing pulses $C_1$ and $C_3$. This output is applied to gates 443, 445, 447 and 449. Thus, no lead or lag corrections are applied during the time interval between pulses $C_1$ and $C_3$. However, the corrections indicated by the states of F/F's 431 and 435 are applied to the VCO during the time interval between timing pulses $C_3$ and $C_1$ if F/F 439 is SET at $C_3$.

It can be seen that gate 443 is enabled when a fine lag correction is indicated, gate 445 is enabled when a fine lead correction is indicated, gates 443 and 447 are enabled when a coarse lag correction is indicated and both gates 445 and 449 are enabled when a coarse lead correction is indicated.

The output stages of the phase correction circuit 49 are simple D/A converters. When the associated gates are not enabled, transistors $Q_1$, $Q_2$, $Q_3$, and $Q_4$ are ON.

This causes essentially ground potential to be present at the collectors and no voltage is applied to the Summation Unite 53. If gate 443 is enabled, $Q_1$ is OFF and a positive voltage is applied to resistor 451. If gate 445 is enabled, $Q_2$ is OFF and a negative voltage is applied to resistor 453. Transistors $Q_3$ and $Q_4$ operate in a similar manner.

The resistor ratios of 8R and R as shown, for purposes of example only, are based on a coarse correction eight times larger than the fine correction. Since, when the coarse lead or lag gate is enabled, the fine lead or lag gate is also enabled, the coarse correction is not exactly eight times the fine correction but is equal to the combined results of the R and 8R resistors in parallel which, of course, is smaller than R and the acutal ratio is somewhat larger than 8:1. It should also be pointed out that the value of the R and 8R resistors includes the collector resistance of the associated transistor. Thus, any desired values of resistance may be used.

The outputs of the resistors are coupled together by line 455 which is coupled to the summation unit 53.

As mentioned previously, the overflow and underflow signals on lines 457 and 459 respectively from reversible counter 52 are used to inhibit operation of the phase correction circuit 49 whenever the counter 52 is inhibited. Thus, if overflow or underflow signals are present on either line 457 or 459, the respective AND gate 461 or 463 is inhibited by the removal of an output from the respective inverter 465 or 467. When no overflow or underflow signals are present, inverters 465 and 467 produce enable signals to AND gates 461 and 463 respectively.

VCO

A VCO used in the present invention should have at least two characteristics. First it should be controllable over a wide range (without band switching) and secondly, the frequency should be logarithmically portional to the control voltage. Such a VCO is described in applicants commonly assigned U.S. Pat. No. 3,382,457.

CLOCK PULSE GENERATOR

Figure 10C:
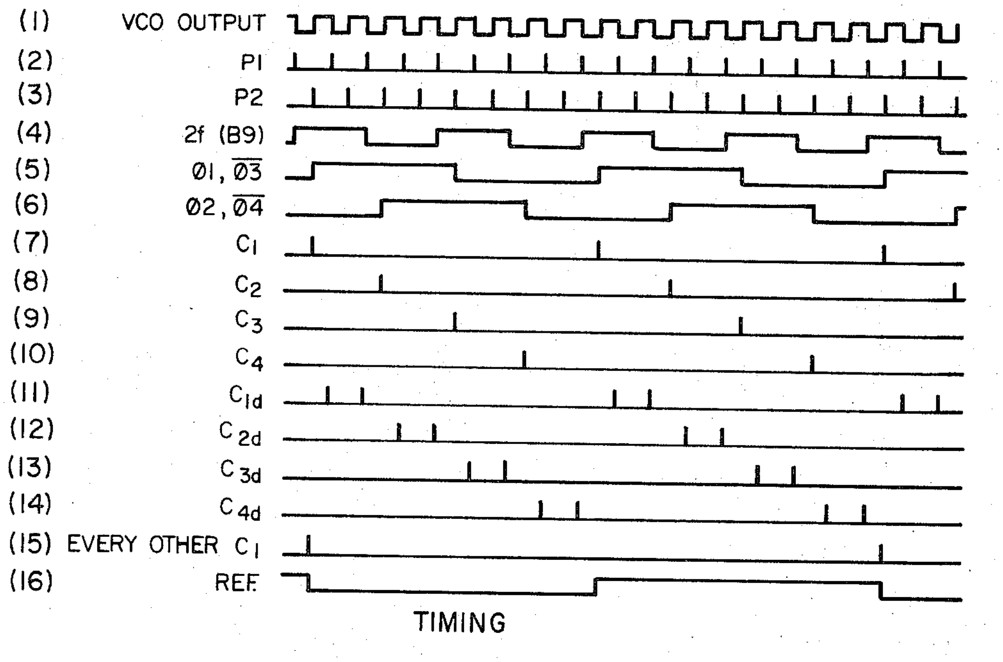
FIGS. 10(*a*), (*b*), and (*c*) illustrate the logic and associated waveforms relative to the clock generator.
Figure 10A:
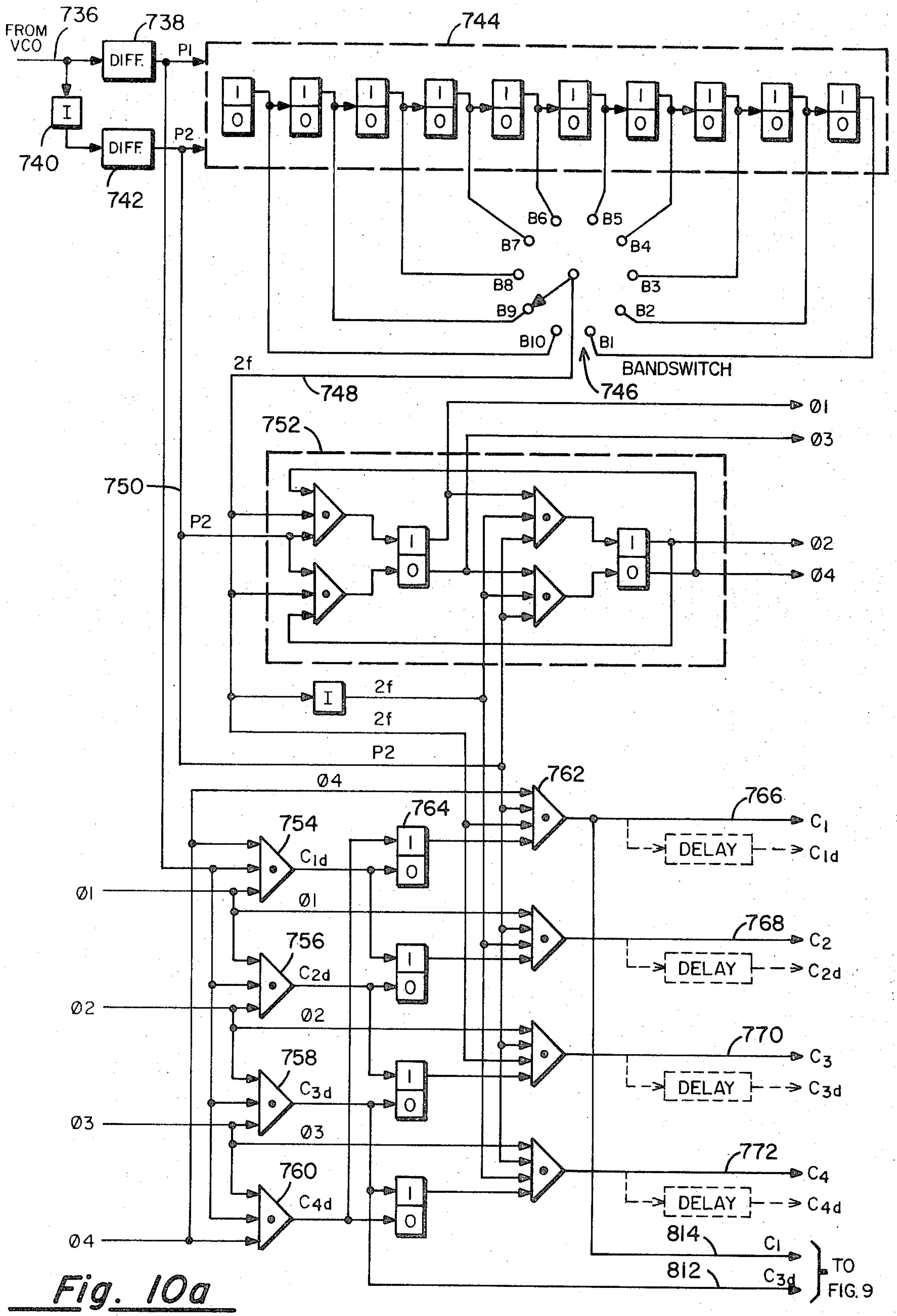
Figure 10B:
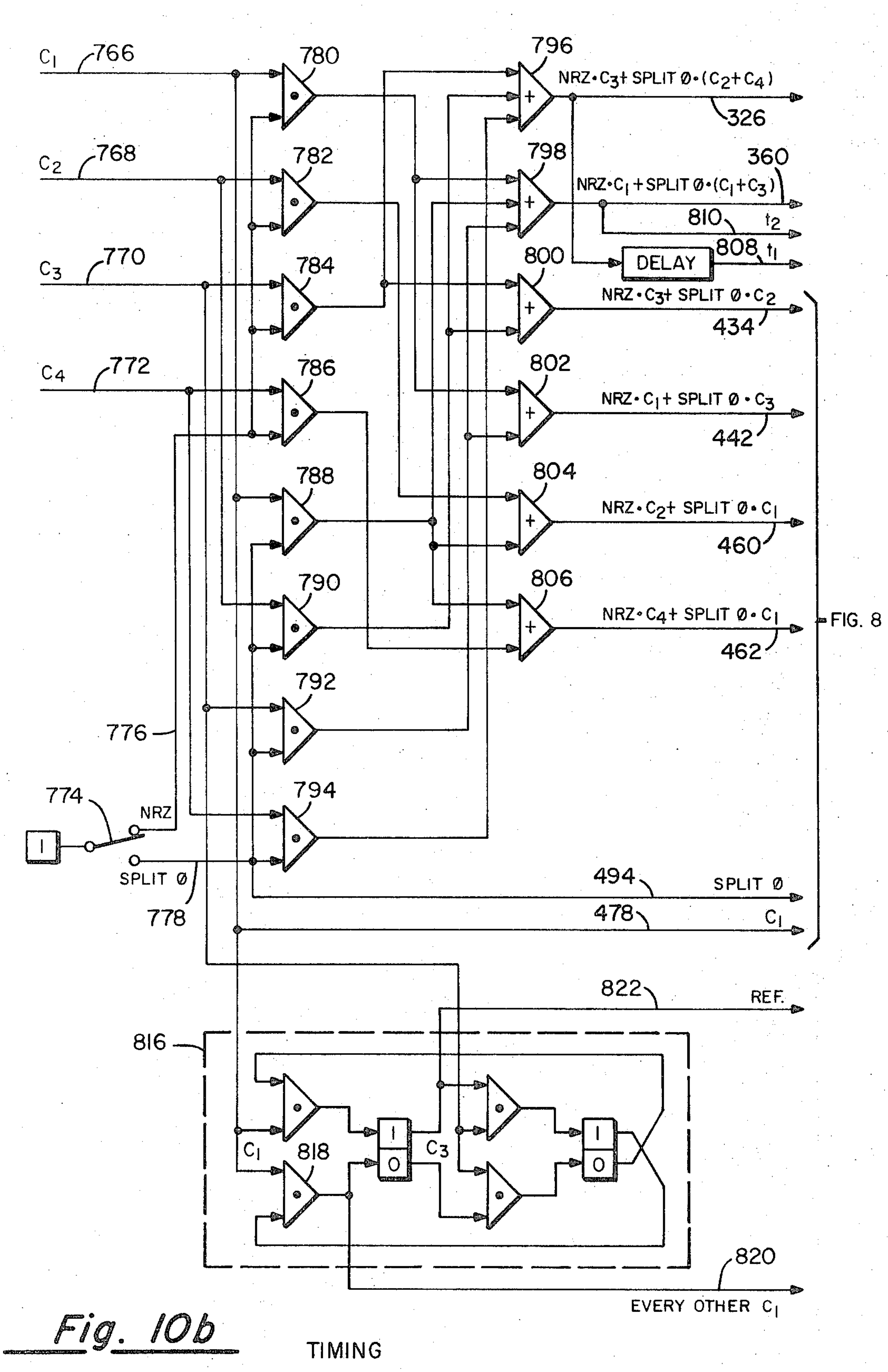

The clock generator and associated waveforms are shown in FIGS. 10(*a*), (*b*) and (*c*). The output from VCO 56 on line 736 in FIG. 10(*a*) is a squarewave as shown by waveform (1) in FIG. 10(*c*) and is applied to differentiator 738 and inverter 740. The output of inverter 740 is applied to differentiator 742. Differentiator 738 and 742 produce pulses at their outputs for negative going transitions at their inputs. These pulses, designated as $P_1$ and $P_2$, are illustrated as waveform (2) and (3) respectively in FIG. 18(*c*). Pulses $P_1$ and $P_2$ are applied to a 10-bit unidirectional, frequency dividing counter 744 the operation of which is similar to that of the counters previously described, without the reversing ability. The output of each stage is brought out to terminals $B_1 - B_{10}$ respectively of bandswitch 746. The frequency at terminal $B_{10}$ is one-half the VCO frequency, at terminal $B_9$ is one-fourth the VCO frequency, etc., with the frequency at terminal $B_1$ being 1/1024 the VCO frequency. Thus, ten bit-rate bands each of one octave width are manually selectable with switch 746. The VCO is manually variable over an octave width and also includes a 1000: 1 band switch as disclosed in detail in applicant's U.S. Pat. No. 3,382,457. Thus, with the VCO operating over a range of 2–4 MHz on the high (X1000) band, bit-rates of 1,000 – 1,000,000 bits per second are obtainable and with the VCO operating over a range of 2–4 KHz on the low (X1) band, bit rates of 1 – 1,000 bits per second are obtainable. These bit rates and the number of stages in counter 744 are given for purposes of example only and can be varied as desired. In the intended operation, the bit synchronizer bit-rate is set within a given percentage of the expected incoming bit-rate by properly setting the multiplier (X1, X1000), the bandswitch ($B_1 - B_{10}$) and the VCO frequency control.

Thus, the output of bandswitch 746 on line 748 is a square wave signal whose frequency is teice the incoming bit rate (after acquisition) as shown by waveform (4) in FIG. 10(*c*) with bandswitch 746 in position $B_9$. This signal, hereinafter referred to as $2_f$, in both its direct and inverted forms along with the signal $P_2$ on line 750, causes counter 752 to produce a 4-phase clock output designated as $\phi_1$, $\phi_2$, $\phi_3$ and $\phi_4$. Counter 752 operates in a similar manner to the general counter stages previously described to produce the four phase clock signal. The $\phi_1$ signal is in the "1" state during the first half of the bit-time and the "0" state during the second half of the bit-time as shown by waveform (5) in FIG. 10(*c*). The $\phi_2$ signal is $\phi_1$ delayed one-fourth bit-time as shown in waveform (6). The $\phi_3$ and $\phi_4$ signals are the inverted waveforms of $\phi_1$ and $\phi_2$ respectively as shown in waveforms (5) and (6) respectively in FIG. 10(*c*).

Signals $P_1$, $\phi_4$ and $\phi_1$ are applied as inputs to AND gate 754 whose output is a pulse designated $C_{1d}$ (clock pulse $C_1$ delayed) as illustrated in waveform (11) or FIG. 18(*c*). With bandswitch 746 in the $B_{10}$ position, the $C_{1d}$ signal will be a single pulse each bit period. In the $B_9$ position as illustrated. a burst of two consecutive $P_1$ pulses occurs each bit-period. As the bandswitch is rotated to each succeeding lower band, the number of pulses in the burst doubles. Likewise, signals $P_1$, $\phi_1$, and $\phi_2$; $P_1$, $\phi_2$, and $\phi_3$; and $P_1$, $\phi_3$ and $\phi_4$ are applied to AND gates 756, 758 and 760 to produce delayed clock pulses $C_{2d}$, $C_{3d}$ and $C_{4d}$ as illustrated by waveforms 12, 13 and 14 in FIG. 10(*c*), respectively.

If AND-gate 762 received only signals $P_2$, 2$f$ and $\phi_4$, a burst of pulsee similar to those described in relation to the delayed pulses would occur. As the output of AND gate 762 is used in controlling the sampling circuitry, only the first pulse of the burst is desired. Therefore an input to AND-gate 762 from flip flop 764 is required. Flip flop 764 is SET by $C_{4d}$ and AND-gate 762 is enabled allowing the first $P_2$ pulse occurring after both the signal designated as 2f and $\phi_4$ exist in the "1" state to appear at the output of AND gate 762. Flip flop 764 is RESET by $C_{1d}$ which inhibits further $P_2$ pulses from appearing at the output of AND-gate 762. The output of AND gate 762 on line 766 is designated as pulse $C_1$ and is illustrated by waveform (7) in FIG. 10(*c*). Note that the circuit as illustrated is self-starting and will not lock-up.

It will readily be seen that clock pulses $C_2$, $C_3$ and $C_4$ on lines 768, 770 and 772 as illustrated in waveforms (8), (9), and (10) on FIG. 10(*c*) are generated in like manner as described for $C_1$. An alternate method of generating the delayed pulses $C_{1d}$, $C_{2d}$, $C_{3d}$, and $C_{4d}$ is shown in dotted lines with the use of delay lines.

As can be seen in FIG. 10(*c*), clock pulse $C_1$ occurs at the beginning (or end) of the bit-time with $C_2$ occurring at the one-fourth bit-time, $C_3$ at the half bit-time and $C_4$ at the three-fourth bit-time.

FIG. 10(*b*) illustrates the logic required for producing timing signals for the Signal Conditioner and Bit Synchronizer. Clock signals $C_1$–$C_4$ are present on lines 766, 768, 770 and 772 respectively. For the reception of NRZ signals, switch 774 in the indicated position applies a "1" to line 776 while at the same time a "0" is present on line 778. For reception of split phase signals, switch 774 is coupled to line 778 and produces a "1" thereon while at the same time a "0" is present on line 776. Various combinations of the outputs of AND-gates 780, 782, 784, 786, 788, 790, 792 and 794 are coupled to OR-gates 796, 798, 800, 802, 804 and 806.

The signal on line 434 is used for timing by I-sampler circuit 44 shown in FIG. 8 while the signal on line 442 is used for timing by Q-sampler circuit 43 shown in FIG. 8. Also the signals on lines 460, 462, 478 and 494 are used for timing by the control logic shown in FIG. 8.

The signals on lines 812 and 814 in FIG. 10(*a*) are used as the clock signals $t_1$ and $t_2$ respectively for the counter 52 in the phase lock loop in FIG. 4 and shown in detail in FIG. 9.

Counter 816 in FIG. 10(*b*) is a one-bit counter the operation of which is similar to that previously disclosed in the general description of the counters. Clock pulses $C_1$ and $C_3$ are applied to counter 816 as the two phase clock signals $t_1$ and $t_2$ respectively. Every other clock pulse $C_1$ is present at the output of AND gate 818 on line 820 as illustrated by waveform (15) in FIG. 10(*c*). The output of counter 816 on line 822 provides the reference waveform (16) shown in FIG. 10(*c*).

I claim:

1. A system for generating clock pulses in synchronism with received information signals, said system comprising:

a. an oscillator for producing said clock pulses;

b. sampling means for periodically sampling said received information signals at first and second points in time within a prescribed interval defined by said clock pulses and determining the polarity of said samples for producing an error signal corresponding to any frequency and phase difference error between said oscillator frequency and said information signal frequency; and c. means coupling said sampling means to said oscillator for causing said oscillator to change frequency in a first direction when the samples obtained at said first and second points in time are of opposite polarity and to change frequency in a second direction when the samples obtained at said first and second points in time are of like polarity.

2. A system as in claim 1 wherein said oscillator is:

a. a voltage controlled oscillator.

3. A system as in claim 2 wherein said coupling means comprises:

a. a frequency control circuit for producing a control signal which is the integral of said error signal; and b. a phase control circuit coupled in parallel with said frequency control circuit for producing a control signal that is directly proportional to said error signal.

4. A system as in claim 3 wherein said frequency control circuit includes:

a digital-to-analog converter having its output coupled to said voltage controlled oscillator; and b. a reversible counter having its output coupled to said digital-to-analog converter and its input coupled to said sampling means whereby said counter counts in a first direction when the samples obtained at said first and second points in time are of opposite polarity and counts in a second direction when the samples obtained at said first and second points in time are of like polarity.

5. A system as in claim 4 further including:

a. means for continually enabling said counter when the received signals are of the split phase type; and b. means for enabling said counter only when the samples obtained at said first point in time in two consecutive clock pulse periods are not alike when the received signals are of the non-return-to-zero type.

6. A system as in claim 5 further including:

a. means for providing coarse counter control to enable coarse correction of the counter whenever the samples obtained at said second point in time exceed a predetermined threshold.

7. A system as in claim 6 wherein said coarse counter control means includes:

a. means for establishing first and second reference voltage levels representing positive and negative coarse correction thresholds;

b. means coupled to said reference establishing means for producing a coarse correction signal for said counter whenever the samples obtained at said second point in time exceed said positive or negative threshold; and c. means coupled to said coarse correction signal producing means and said counter for enabling said coarse correction signal to be applied to a selected one of the stages of said counter.

8. A system as in claim 1 wherein said sampling means comprises:

a. first and second parallel integrators having their integration periods centered about said first and second points in time respectively; and b. means coupled to said integrators for determining the polarity of the output of the integrators at the end of their respective integration periods.

* * * * *